United States Patent
Goto et al.

(10) Patent No.: US 9,354,373 B2
(45) Date of Patent: May 31, 2016

(54) POLARIZING PLATE AND METHOD OF PRODUCING POLARIZING PLATE

(71) Applicant: NITTO DENKO CORPORATION, Ibaraki-shi, Osaka (JP)

(72) Inventors: Shusaku Goto, Ibaraki (JP); Takeshi Saitou, Ibaraki (JP); Masashi Shinagawa, Ibaraki (JP); Yuuki Nakano, Ibaraki (JP); Minoru Miyatake, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 118 days.

(21) Appl. No.: 14/095,517

(22) Filed: Dec. 3, 2013

(65) Prior Publication Data
US 2014/0285887 A1 Sep. 25, 2014

(51) Int. Cl.
*G02B 5/30* (2006.01)
*B32B 37/12* (2006.01)
(Continued)

(52) U.S. Cl.
CPC .............. *G02B 5/305* (2013.01); *B29C 55/026* (2013.01); *B32B 37/12* (2013.01); *B29K 2029/04* (2013.01); *B32B 38/10* (2013.01); *B32B 38/14* (2013.01); *B32B 2037/1253* (2013.01); *B32B 2037/1276* (2013.01); *B32B 2037/243* (2013.01); *B32B 2038/0028* (2013.01); *B32B 2307/42* (2013.01);
(Continued)

(58) Field of Classification Search
CPC ........ G02B 5/305; B32B 37/12; B32B 38/10; B32B 38/14; B32B 2037/1253; B32B 2037/1276; B32B 2037/243; B32B 2038/0028; B32B 2307/42; B32B 2309/105; B32B 2457/202; B29K 2029/04

USPC ...................................................... 359/487.02
See application file for complete search history.

(56) References Cited

U.S. PATENT DOCUMENTS 7,126,754 B2 * 10/2006 Yamaoka et al. ........ 359/485.03
8,699,135 B2    4/2014 Goto et al.
(Continued)

FOREIGN PATENT DOCUMENTS

CN 102096142 A  6/2011
CN 102859402 A  1/2013
(Continued)

OTHER PUBLICATIONS

Korean Office Action dated Dec. 24, 2014, issued in corresponding KR application No. 2013-0153487, with English translation. (17 pages).
(Continued)

*Primary Examiner* — Frank Font
(74) *Attorney, Agent, or Firm* — Westerman, Hattori, Daniels & Adrian, LLP

(57) ABSTRACT

A method of producing a polarizing plate according to an embodiment of the present invention includes: stretching and dyeing a laminate including a resin substrate and a polyvinyl alcohol-based resin layer formed on one side of the resin substrate to produce a polarizing film on the resin substrate; laminating a first protective film on the polarizing film on an opposite side to the resin substrate; and peeling the resin substrate, followed by laminating a second protective film on the polarizing film on a side from which the resin substrate has been peeled. The laminating of at least one of the first protective film and the second protective film is performed through an adhesive having a moisture content of 10% or less.

9 Claims, 1 Drawing Sheet

(51) Int. Cl.
  *B29C 55/02* (2006.01)
  *B32B 38/10* (2006.01)
  *B32B 38/14* (2006.01)
  *B32B 37/24* (2006.01)
  *B32B 38/00* (2006.01)
  *B29K 29/00* (2006.01)

(52) U.S. Cl.
  CPC ..... *B32B 2309/105* (2013.01); *B32B 2457/202* (2013.01)

(56) References Cited

U.S. PATENT DOCUMENTS

| | | | |
|---|---|---|---|
| 8,722,182 B2 | 5/2014 | Akari et al. | |
| 9,039,861 B2 | 5/2015 | Yasui et al. | |
| 2005/0122586 A1* | 6/2005 | Adachi et al. | 359/487 |
| 2007/0224415 A1* | 9/2007 | Satake et al. | 428/341 |
| 2007/0285603 A1* | 12/2007 | Nakayama et al. | 349/118 |
| 2008/0112047 A1* | 5/2008 | Mizushima et al. | 359/485 |
| 2008/0137187 A1* | 6/2008 | Nishida et al. | 359/485 |
| 2008/0252973 A1 | 10/2008 | Akari et al. | |
| 2009/0040611 A1* | 2/2009 | Kitamura et al. | 359/500 |
| 2012/0281279 A1* | 11/2012 | Goto et al. | 359/487.02 |
| 2013/0160938 A1 | 6/2013 | Yasui et al. | |
| 2013/0216805 A1 | 8/2013 | Yasui et al. | |
| 2013/0244041 A1 | 9/2013 | Cho et al. | |
| 2014/0085722 A1 | 3/2014 | Yasui et al. | |
| 2014/0130955 A1 | 5/2014 | Yasui et al. | |
| 2014/0302328 A1 | 10/2014 | Cho et al. | |

FOREIGN PATENT DOCUMENTS

| | | |
|---|---|---|
| JP | 2001-343521 A | 12/2001 |
| JP | 2007-279243 A | 10/2007 |
| JP | 2007-292872 A | 11/2007 |
| JP | 4744496 B2 | 8/2011 |
| JP | 2012-53078 A | 3/2012 |
| JP | 2012-118521 A | 6/2012 |
| JP | 2012-133308 A | 7/2012 |
| JP | 2012-181279 A | 9/2012 |
| JP | 2012-256018 A | 12/2012 |
| JP | 2013-011774 A | 1/2013 |
| JP | 2013-160885 A | 8/2013 |
| KR | 10-2012-0044237 | 5/2012 |
| TW | 201211598 A | 3/2012 |
| TW | 201231520 A | 8/2012 |
| WO | 2012/161123 A1 | 11/2012 |

OTHER PUBLICATIONS

Explanation of Circumstances dated Dec. 6, 2013, issued in Japanese Patent Application No. 2013-056412, with English Translation (8 pages).
Japanese Office Action dated Jan. 15, 2014, issued in corresponding Japanese Patent Application No. 2013-056412 with English translation (9 pages).
Notification of Reasons for Rejection dated May 26, 2015, issued in counterpart Taiwanese Patent Application No. 102143828 w/English translation (13 pages).
Office Action dated Nov. 3, 2015, issued in counterpart Chinese Patent Application No. 201410099323.0, with English translation. (13 pages).
Office Action dated Nov. 25, 2015, issued in counterpart Japanese Patent Application No. 2013-56412, with English translation. (14 pages).

* cited by examiner

POLARIZING PLATE AND METHOD OF PRODUCING POLARIZING PLATE

This application claims priority under 35 U.S.C. Section 119 to Japanese Patent Application No. 2013-56412 filed on Mar. 19, 2013, which is herein incorporated by reference.

BACKGROUND OF THE INVENTION

1. Field of the Invention

The present invention relates to a method of producing a polarizing plate.

2. Description of the Related Art

Polarizing films are placed on both sides of a liquid crystal cell of a liquid crystal display apparatus as a typical image display apparatus, the placement being attributable to an image-forming mode of the apparatus. For example, the following method has been proposed as a method of manufacturing the polarizing film (for example, Japanese Patent Application Laid-open No. 2001-343521). A laminate having a resin substrate and a polyvinyl alcohol (PVA)-based resin layer is stretched, and is then subjected to a dyeing treatment so that the polarizing film may be formed on the resin substrate. According to such method, a polarizing film having a small thickness is formed. Accordingly, the method has been attracting attention because of its potential to contribute to thinning of an image display apparatus in recent years.

By the way, typically, the polarizing film is used as a polarizing plate by being laminated together with a protective film. However, there occurs a case where optical characteristics of the polarizing plate employing the polarizing film produced by using the resin substrate are insufficient.

SUMMARY OF THE INVENTION

According to an embodiment of the present invention, there is provided a method of producing a polarizing plate having excellent optical characteristics.

A method of producing a polarizing plate according to an embodiment of the present invention includes: stretching and dyeing a laminate including a resin substrate and a polyvinyl alcohol-based resin layer formed on one side of the resin substrate to produce a polarizing film on the resin substrate; laminating a first protective film on the polarizing film on an opposite side to the resin substrate; and peeling the resin substrate, followed by laminating a second protective film on the polarizing film on a side from which the resin substrate has been peeled. The laminating of at least one of the first protective film and the second protective film is performed through an adhesive having a moisture content of 10% or less.

In one embodiment of the present invention, the laminating of the first protective film is performed through an aqueous adhesive.

A method of producing a polarizing plate according to another embodiment of the present invention includes: stretching and dyeing a laminate including a resin substrate and a polyvinyl alcohol-based resin layer formed on one side of the resin substrate to produce a polarizing film on the resin substrate; and peeling the resin substrate, followed by laminating a protective film on the polarizing film on a side from which the resin substrate has been peeled. The laminating of the protective film is performed through an adhesive having a moisture content of 10% or less.

In one embodiment of the present invention, the adhesive includes an active energy ray-curable adhesive.

According to another aspect of the present invention, a polarizing plate is provided. The polarizing plate is obtained by the production method as described above.

DETAILED DESCRIPTION OF THE PREFERRED EMBODIMENTS

Hereinafter, preferred embodiments of the present invention are described. However, the present invention is not limited to these embodiments.

The present invention relates to a method of producing a polarizing plate including stretching and dyeing a laminate including a resin substrate and a polyvinyl alcohol-based resin layer formed on one side of the resin substrate to produce a polarizing film on the resin substrate. In the present invention, at least one of protective films, which are laminated on one side or both sides of the polarizing film, is laminated through an adhesive having a moisture content of 10% or less. In one embodiment, the method of producing a polarizing plate of the present invention includes: stretching and dyeing a laminate including a resin substrate and a polyvinyl alcohol-based resin layer formed on one side of the resin substrate to produce a polarizing film on the resin substrate; laminating a first protective film on the polarizing film on an opposite side to the resin substrate; and peeling the resin substrate, followed by laminating a second protective film on the polarizing film on a side from which the resin substrate has been peeled (hereinafter referred to as "first embodiment" for convenience). In another embodiment, the method of producing a polarizing plate of the present invention includes: stretching and dyeing a laminate including a resin substrate and a polyvinyl alcohol-based resin layer formed on one side of the resin substrate to produce a polarizing film on the resin substrate; and peeling the resin substrate, followed by laminating a protective film on the polarizing film on a side from which the resin substrate has been peeled (hereinafter referred to as "second embodiment"). It should be noted that the protective film in the second embodiment is sometimes referred to as "second protective film" for convenience because the protective film corresponds to the second protective film in the first embodiment from the viewpoint of, for example, a lamination position. As described above, in the present invention, at least one of the first protective film and the second protective film can be laminated through an adhesive having a moisture content of 10% or less. Hereinafter, each step is specifically described. For simplicity, the respective steps are sequentially described for the first embodiment and only a portion different from that of the first embodiment is described for the second embodiment.

First Embodiment

A. Step of Producing Polarizing Film

A-1. Laminate

Figure 1A:
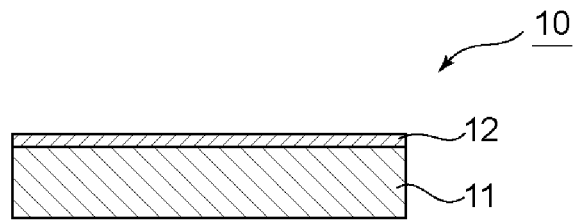
FIGS. 1A to 1C are schematic views each illustrating an example of a method of producing a polarizing plate of the present invention.
Figure 1B:
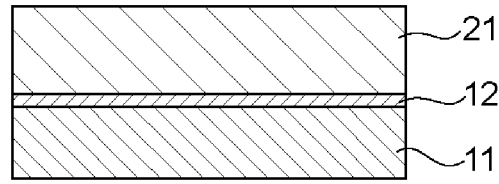
Figure 1C:
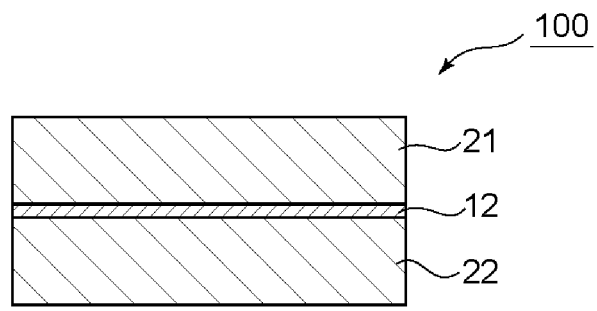

FIGS. 1A to 1C are schematic views each illustrating an example of a method of producing a polarizing plate of the present invention. As illustrated in FIG. 1A, a laminate 10 has a resin substrate 11 and a polyvinyl alcohol-based resin layer 12. The laminate 10 is typically produced by forming the polyvinyl alcohol-based resin layer 12 on the resin substrate 11 having a long shape. Any appropriate method may be adopted as a method of forming the polyvinyl alcohol-based resin layer 12. The polyvinyl alcohol-based resin (hereinafter referred to as "PVA-based resin") layer 12 is preferably formed by applying an application liquid containing a PVA-based resin onto the resin substrate 11 and drying the liquid.

As a formation material for the resin substrate, any appropriate thermoplastic resin may be adopted. Examples of the thermoplastic resin include: an ester-based resin such as a polyethylene terephthalate-based resin; a cycloolefin-based resin such as a norbornene-based resin; an olefin-based resin such as polypropylene; a polyamide-based resin; a polycarbonate-based resin; and a copolymer resin thereof. Of those, a norbornene-based resin and an amorphous polyethylene terephthalate-based resin are preferred.

In one embodiment, an amorphous (uncrystallized) polyethylene terephthalate-based resin is preferably used. In particular, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid component and a copolymer further containing cyclohexane dimethanol as a glycol component.

When an underwater stretching mode is adopted in a stretching treatment to be described later, the resin substrate can absorb water and the water acts as like a plasticizer so that the substrate can plasticize. As a result, a stretching stress can be significantly reduced. Accordingly, the stretching can be performed at a high ratio and the stretchability of the resin substrate can be more excellent than that at the time of in-air stretching. As a result, a polarizing film having excellent optical characteristics can be produced. In one embodiment, the percentage of water absorption of the resin substrate is preferably 0.2% or more, more preferably 0.3% or more. Meanwhile, the percentage of water absorption of the resin substrate is preferably 3.0% or less, more preferably 1.0% or less. The use of such resin substrate can prevent, for example, the following inconvenience: the dimensional stability of the resin substrate remarkably reduces at the time of the production and hence the external appearance of the polarizing film to be obtained deteriorates. In addition, the use of such resin substrate can prevent the rupture of the substrate at the time of the underwater stretching and the peeling of the PVA-based resin layer from the resin substrate. It should be noted that the percentage of water absorption of the resin substrate can be adjusted by, for example, introducing a modification group into the constituent material. The percentage of water absorption is a value determined in conformity with JIS K 7209.

The glass transition temperature (Tg) of the resin substrate is preferably 170° C. or less. The use of such resin substrate can sufficiently secure the stretchability of the laminate while suppressing the crystallization of the PVA-based resin layer. Further, the glass transition temperature is more preferably 120° C. or less in consideration of the plasticization of the resin substrate by water and favorable performance of the underwater stretching. In one embodiment, the glass transition temperature of the resin substrate is preferably 60° C. or more. The use of such resin substrate prevents an inconvenience such as the deformation of the resin substrate (e.g., the occurrence of unevenness, a slack, or a wrinkle) during the application and drying of the application liquid containing the PVA-based resin, thereby enabling favorable production of the laminate. In addition, the use enables favorable stretching of the PVA-based resin layer at a suitable temperature (e.g., about 60° C.). In another embodiment, a glass transition temperature of less than 60° C. is permitted as long as the resin substrate does not deform during the application and drying of the application liquid containing the PVA-based resin. It should be noted that the glass transition temperature of the resin substrate can be adjusted by, for example, introducing a modification group into the formation material or heating the substrate constituted of a crystallization material. The glass transition temperature (Tg) is a value determined in conformity with JIS K 7121.

The thickness of the resin substrate before the stretching is preferably 20 μm to 300 μm, more preferably 50 μm to 200 μm. When the thickness is less than 20 μm, it may be difficult to form the PVA-based resin layer. When the thickness exceeds 300 μm, in, for example, underwater stretching, it may take a long time for the resin substrate to absorb water, and an excessively large load may be needed in the stretching.

Any appropriate resin may be adopted as the PVA-based resin for forming the PVA-based resin layer. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin may be appropriately selected depending on purposes. The average polymerization degree is typically 1,000 to 10,000, preferably 1,200 to 5,000, more preferably 1,500 to 4,500. It should be noted that the average polymerization degree can be determined in conformity with JIS K 6726-1994.

The application liquid is typically a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. They may be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained.

Any appropriate method may be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more.

The thickness of the PVA-based resin layer before the stretching is preferably 3 μm to 40 μm, more preferably 3 μm to 20 μm.

The resin substrate may be subjected to a surface treatment (such as a corona treatment) before the formation of the PVA-based resin layer. Alternatively, an easy-adhesion layer may be formed on the resin substrate. Such treatment can improve adhesiveness between the resin substrate and the PVA-based resin layer.

A-2. Stretching of Laminate

Any appropriate method may be adopted as a method of stretching the laminate. Specifically, fixed-end stretching may be adopted or free-end stretching (such as a method involving passing the laminate through rolls having different peripheral speeds to uniaxially stretch the laminate) may be adopted. Of those, free-end stretching is preferred.

The stretching direction of the laminate may be appropriately set. In one embodiment, the laminate having a long shape is stretched in its lengthwise direction. In this case, there may be typically adopted a method involving passing the laminate between rolls having different peripheral speeds to stretch the laminate. In another embodiment, the laminate having a long shape is stretched in its widthwise direction. In this case, there may be typically adopted a method involving stretching the laminate using a tenter stretching apparatus.

A stretching mode is not particularly limited and may be an in-air stretching mode or an underwater stretching mode. Of those, an underwater stretching mode is preferred. According to the underwater stretching mode, the stretching can be performed at a temperature lower than the glass transition temperature (typically about 80° C.) of each of the resin substrate and the PVA-based resin layer, and hence the PVA-based resin layer can be stretched at a high ratio while its crystallization is suppressed. As a result, a polarizing film having excellent optical characteristics can be produced.

The stretching of the laminate may be performed in one stage, or may be performed in a plurality of stages. When the stretching is performed in a plurality of stages, for example, the free-end stretching and the fix-end stretching may be performed in combination, or the underwater stretching mode and the in-air stretching mode may be performed in combination. When the stretching is performed in a plurality of stages, the stretching ratio (maximum stretching ratio) of the laminate to be described later is the product of stretching ratios in the respective stages.

The stretching temperature of the laminate may be set to any appropriate value depending on, for example, a formation material for the resin substrate and the stretching mode. When the in-air stretching mode is adopted, the stretching temperature is preferably equal to or higher than the glass transition temperature (Tg) of the resin substrate, more preferably Tg+10° C. or more, particularly preferably Tg+15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted as a stretching mode, the liquid temperature of a stretching bath is preferably 40° C. to 85° C., more preferably 50° C. to 85° C. At such temperature, the PVA-based resin layer can be stretched at a high ratio while its dissolution is suppressed. Specifically, as described above, the glass transition temperature (Tg) of the resin substrate is preferably 60° C. or more in relation to the formation of the PVA-based resin layer. In this case, when the stretching temperature falls short of 40° C., there is a possibility that the stretching cannot be satisfactorily performed even in consideration of the plasticization of the resin substrate by water. On the other hand, as the temperature of the stretching bath increases, the solubility of the PVA-based resin layer is raised and hence excellent optical characteristics may not be obtained. The laminate is preferably immersed in the stretching bath for a time of 15 seconds to 5 minutes.

When the underwater stretching mode is adopted, the laminate is preferably stretched while being immersed in an aqueous solution of boric acid (in-boric-acid-solution stretching). The use of the aqueous solution of boric acid as the stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be satisfactorily stretched with the aid of the rigidity and the water resistance imparted thereto, and hence a polarizing film having excellent optical characteristics can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the PVA-based resin layer, thereby enabling the production of a polarizing film having additionally high characteristics. It should be noted that an aqueous solution obtained by dissolving a boron compound such as borax, glyoxal, glutaric aldehyde, or the like as well as boric acid or the borate in the solvent may also be used.

When the PVA-based resin layer has been caused to adsorb a dichromatic substance (typically iodine) in advance by dyeing to be described later, the stretching bath (aqueous solution of boric acid) is preferably compounded with an iodide. Compounding the bath with the iodide can suppress the elution of iodine that the PVA-based resin layer has been caused to adsorb. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The concentration of the iodide is preferably 0.05 part by weight to 15 parts by weight, more preferably 0.5 part by weight to 8 parts by weight with respect to 100 parts by weight of water.

The stretching ratio (maximum stretching ratio) of the laminate is preferably 5.0 times or more with respect to the original length of the laminate. Such high stretching ratio can be achieved by adopting, for example, the underwater stretching mode (in-boric-acid-solution stretching). It should be noted that the term "maximum stretching ratio" as used in this specification refers to a stretching ratio immediately before the rupture of the laminate. The stretching ratio at which the laminate ruptures is separately identified and a value lower than the value by 0.2 is the maximum stretching ratio.

In one embodiment, the laminate is subjected to in-air stretching at high temperature (e.g., 95° C. or more), and then subjected to the in-boric-acid-solution stretching, and dyeing to be described later. Such in-air stretching is hereinafter referred to as "preliminary in-air stretching" because the stretching can be ranked as stretching preliminary or auxiliary to the in-boric-acid-solution stretching.

When the preliminary in-air stretching is combined with the in-boric-acid-solution stretching, the laminate can be stretched at an additionally high ratio in some cases. As a result, a polarizing film having additionally excellent optical characteristics (such as a polarization degree) can be produced. For example, when a polyethylene terephthalate-based resin is used as the resin substrate, the resin substrate can be stretched satisfactorily, while its orientation is suppressed, by a combination of the preliminary in-air stretching and the in-boric-acid-solution stretching than that in the case of the in-boric-acid-solution stretching alone. As the orientation property of the resin substrate is raised, its stretching tension increases and hence it becomes difficult to stably stretch the substrate or the resin substrate ruptures. Accordingly, the laminate can be stretched at an additionally high ratio by stretching the resin substrate while suppressing its orientation.

In addition, when the preliminary in-air stretching is combined with the in-boric-acid-solution stretching, the orientation property of the PVA-based resin is improved and hence the orientation property of the PVA-based resin can be improved even after the in-boric-acid-solution stretching. Specifically, the orientation property of the PVA-based resin is improved in advance by the preliminary in-air stretching so that the PVA-based resin may easily cross-link with boric acid during the in-boric-acid-solution stretching. Then, the stretching is performed in a state where boric acid serves as a junction, and hence the orientation property of the PVA-based resin is assumed to be high even after the in-boric-acid-solution stretching. As a result, a polarizing film having excellent optical characteristics (such as a polarization degree) can be produced.

The stretching ratio in the preliminary in-air stretching is preferably 3.5 times or less. A stretching temperature in the preliminary in-air stretching is preferably equal to or higher than the glass transition temperature of the PVA-based resin. The stretching temperature is preferably 95° C. to 150° C. It should be noted that the maximum stretching ratio when the preliminary in-air stretching and the in-boric-acid-solution stretching are combined with each other is preferably 5.0 times or more, more preferably 5.5 times or more, still more preferably 6.0 times or more with respect to the original length of the laminate.

A-3. Dyeing

The dyeing is typically performed by causing the PVA-based resin layer to adsorb a dichromatic substance (preferably iodine). A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, a method involving immersing the laminate in the dyeing liquid is preferred. This is because iodine can satisfactorily adsorb to the layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide so that the solubility of iodine in water may be increased. Specific examples of the iodide are as described above. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. so that the dissolution of the PVA-based resin may be suppressed. When the PVA-based resin layer is immersed in the dyeing liquid, an immersion time is preferably 5 seconds to 5 minutes so that the transmittance of the PVA-based resin layer may be secured. In addition, the dyeing conditions (the concentration, the liquid temperature, and the immersion time) can be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be 40% to 44%.

The dyeing treatment can be performed at any appropriate timing. When the underwater stretching is performed, the dyeing treatment is preferably performed before the underwater stretching.

A-4. Any Other Treatment

The laminate may be appropriately subjected to a treatment for forming the PVA-based resin layer into a polarizing film in addition to the stretching and dyeing. Examples of the treatment for forming the PVA-based resin layer into the polarizing film include an insolubilizing treatment, a cross-linking treatment, a washing treatment, and a drying treatment. It should be noted that the number of times, order, and the like of these treatments are not particularly limited.

The insolubilizing treatment is typically performed by immersing the PVA-based resin layer in an aqueous solution of boric acid. Water resistance can be imparted to the PVA-based resin layer by subjecting the layer to the insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C. The insolubilizing treatment is preferably performed before the underwater stretching treatment or the dyeing treatment.

The cross-linking treatment is typically performed by immersing the PVA-based resin layer in an aqueous solution of boric acid. Water resistance can be imparted to the PVA-based resin layer by subjecting the layer to the cross-linking treatment. The concentration of the aqueous solution of boric acid is preferably 1 part by weight to 5 parts by weight with respect to 100 parts by weight of water. In addition, when the cross-linking treatment is performed after the dyeing treatment, the solution is preferably further compounded with an iodide. Compounding the solution with the iodide can suppress the elution of iodine which the PVA-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 60° C. The cross-linking treatment is preferably performed before the underwater stretching treatment. In a preferred embodiment, the dyeing treatment, the cross-linking treatment, and the underwater stretching treatment are performed in the stated order.

The washing treatment is typically performed by immersing the PVA-based resin layer in an aqueous solution of potassium iodide. The drying temperature in the drying treatment is preferably 30° C. to 100° C.

A-5. Polarizing Film

The polarizing film is substantially a PVA-based resin layer that adsorbs and orients a dichromatic substance. The thickness of the polarizing film is typically 25 μm or less, preferably 15 μm or less, more preferably 10 μm or less, still more preferably 7 μm or less, particularly preferably 5 μm or less. Meanwhile, the thickness of the polarizing film is preferably 0.5 μm or more, more preferably 1.5 μm or more. The polarizing film preferably shows absorption dichroism at any wavelength in the wavelength range of 380 nm to 780 nm. The single axis transmittance of the polarizing film is preferably 40.0% or more, more preferably 41.0% or more, still more preferably 42.0% or more, particularly preferably 43.0% or more. The polarization degree of the polarizing film is preferably 99.8% or more, more preferably 99.9% or more, still more preferably 99.95% or more.

B. Lamination of First Protective Film

After the laminate (PVA-based resin layer) has been subjected to the respective treatments, a first protective film 21 is laminated on the laminate on the polarizing film (PVA-based resin layer) 12 side as illustrated in FIG. 1B. Typically, the first protective film of a long shape is laminated on the long laminate so that their lengthwise directions may be aligned with each other. It should be noted that the laminating step may be performed after the lamination of the second protective film on the peeled surface after the peeling of the resin substrate. In addition, the laminating step may be omitted like the second embodiment to be described later.

As described later, in one embodiment, the first protective film is attached by applying an aqueous adhesive to the surface of the polarizing film and heating the resultant. The optical characteristics of the polarizing film can be improved by laminating the first protective film as described above. One possible factor for the improvement of the optical characteristics is the fact that an iodine complex having low orientation property that contributes to the optical characteristics to a low degree can be selectively decomposed by the heating. Specifically, the resin substrate side (lower side) and surface side (upper side) of the polarizing film formed on the resin substrate may be different from each other in construction. Specifically, the lower side and the upper side may be different from each other in orientation property of the PVA-based resin. The orientation property of the iodine complex present in a portion having low orientation property is also low. Accordingly, the complex contributes to the optical characteristics (especially a polarization degree) to a low degree. In addition, the complex can be a cause for the reduction of the optical characteristics (especially a transmittance). Meanwhile, by virtue of its low orientation property, such iodine complex has a weak bonding strength and is easily decomposed. As a result, the iodine complex having low orientation property is selectively decomposed by the heating, and hence absorption in a visible light region can be reduced and the transmittance can be increased. It should be noted that even when the iodine complex having low orientation property is decomposed, the reduction of the polarization degree is minimized because the degree to which the complex contributes to the polarization degree is originally low.

The first protective film can also function as, for example, a retardation film.

Any appropriate resin film may be adopted as the first protective film. A material for forming the protective film is exemplified by: a cellulose-based resin such as triacetyl cellulose (TAC); a cycloolefin-based resin such as a norbornene-based resin; an olefin-based resin such as polyethylene or polypropylene; a polyester-based resin; and a (meth) acrylic resin. It should be noted that the term "(meth) acrylic resin" refers to an acrylic resin and/or a methacrylic resin.

The thickness of the first protective film is typically 10 μm to 100 μm. It should be noted that the first protective film may be subjected to various surface treatments.

In one embodiment, the moisture permeability of the first protective film is preferably 100 g/m²·24 h or less, more preferably 90 g/m²·24 h or less. When the first protective film satisfies such moisture permeability, the heating can be performed in a state where moisture present in the PVA-based resin layer is retained in the layer. When the heating is performed in the presence of the moisture, in particular, the iodine complex (having low orientation property) that has been solubilized in water is easily decomposed and can be decomposed into an iodine ion, and hence the absorption in the visible light region by the polarizing film to be obtained can be reduced and the transmittance can be increased. It should be noted that the "moisture permeability" is a value determined by measuring the amount (g) of water vapor, which passes a sample having an area of 1 m² within 24 hours in an atmosphere having a temperature of 40° C. and a humidity of 92% RH, in conformity with the moisture permeability test (cup method) of JIS 20208.

C. Lamination of Second Protective Film

In this embodiment, as illustrated in FIG. 1C, the resin substrate 11 is peeled from the polarizing film 12 and then a second protective film 22 is laminated on the peeled surface. Typically, the second protective film of a long shape is laminated on the long polarizing film so that their lengthwise directions may be aligned with each other.

The characteristics, constituent material, thickness, and the like of the second protective film are as described for the first protective film.

D. Adhesive to be Used in Lamination of First Protective Film and/or Second Protective Film In the present invention, as described above, at least one of the first protective film 21 and the second protective film 22 can be laminated through the adhesive having a moisture content of 10% or less (hereinafter sometimes referred to as "low-moisture content adhesive"). For example, only the first protective film 21 may be laminated through the low-moisture content adhesive, only the second protective film 22 may be laminated through the low-moisture content adhesive, or both the first protective film 21 and the second protective film 22 may each be laminated through the low-moisture content adhesive. In one embodiment, both the first protective film 21 and the second protective film 22 can each be laminated through the low-moisture content adhesive. In another embodiment, the first protective film 21 can be laminated through the low-moisture content adhesive and the second protective film can be laminated through any appropriate adhesive or pressure-sensitive adhesive. In still another embodiment, the second protective film 22 can be laminated through the low-moisture content adhesive and the first protective film 21 can be laminated through any appropriate adhesive or pressure-sensitive adhesive.

D-1. Adhesive Having Moisture Content of 10% or Less

The moisture content of the adhesive having a moisture content of 10% or less (low-moisture content adhesive) is preferably 5% or less, more preferably 3% or less. A polarizing plate excellent in optical characteristics can be produced by laminating the first protective film and/or the second protective film with such adhesive. In one embodiment, the second protective film can be laminated through the low-moisture content adhesive. In this case, the orientation property of the PVA-based resin can be retained by laminating the second protective film in a state where a moisture content in the polarizing film is small. Specifically, although the resin substrate side (lower side) and the surface side (upper side) may be different from each other in orientation property of the PVA-based resin as described above, the decomposition of the iodine complex due to the reduction of the orientation property caused by the moisture can be suppressed. In one embodiment, the first protective film can be laminated through an aqueous adhesive to be described later and the second protective film can be laminated through the low-moisture content adhesive. In this case, a state where the moisture is excessively present in the polarizing film can be avoided and hence the reduction of its optical characteristics can be suppressed.

Any appropriate adhesive is used as the adhesive having a moisture content of 10% or less as long as the adhesive can satisfy the moisture content. An active energy ray-curable adhesive is preferably used. This is because the active energy ray-curable adhesive can satisfactorily achieve the moisture content. Any appropriate adhesive may be used as the active energy ray-curable adhesive as long as the adhesive can cure through irradiation with an active energy ray. Examples of the active energy ray-curable adhesive include a UV-curable adhesive and an electron beam-curable adhesive.

For example, a radically curable, cationically curable, or anionically curable adhesive may be selected as the active energy ray-curable adhesive as required, and an appropriate combination of such adhesives such as a hybrid of a radically curable adhesive and a cationically curable adhesive may also be used.

The radically curable adhesive is, for example, an adhesive containing, as a curing component, a compound (e.g., a monomer and/or an oligomer) having a radically polymerizable group such as a (meth)acrylate group or a (meth) acrylamide group. It should be noted that the term "(meth)acryl" refers to "acryl and/or methacryl."

The radically curable adhesive is specifically, for example, an active energy ray-curable adhesive composition containing, as curable components, a radically polymerizable compound (A) having an SP value of 29.0 $(kJ/m^3)^{1/2}$ or more and 32.0 $(kJ/m^3)^{1/2}$ or less, a radically polymerizable compound (B) having an SP value of 18.0 $(kJ/m^3)^{1/2}$ or more and less than 21.0 $(kJ/m^3)^{1/2}$, and a radically polymerizable compound (C) having an SP value of 21.0 $(kJ/m^3)^{1/2}$ or more and 23.0 $(kJ/m^3)^{1/2}$ or less, and an acrylic oligomer (D) obtained by polymerizing a (meth) acrylic monomer, in which the content of the radically polymerizable compound (B) is 25 to 80 wt % with respect to 100 wt % of the total amount of the composition. It should be noted that the term "total amount of the composition" as used herein means a total amount including various initiators and additives in addition to the radically polymerizable compounds.

Any compound may be used as the radically polymerizable compound (A) without limitation as long as the compound has a radically polymerizable group such as a (meth) acrylate group, and has an SP value of 29.0 $(kJ/m^3)^{1/2}$ or more and 32.0 $(kJ/m^3)^{1/2}$ or less. Specific examples of the radically polymerizable compound (A) include hydroxyethyl acrylamide (SP value: 29.6) and N-methylol acrylamide (SP value: 31.5).

Any compound may be used as the radically polymerizable compound (B) without limitation as long as the compound has a radically polymerizable group such as a (meth) acrylate group, and has an SP value of 18.0 $(kJ/m^3)^{1/2}$ or more and less than 21.0 $(kJ/m^3)^{1/2}$. Specific examples of the radically polymerizable compound (B) include tripropylene glycol diacrylate (SP value: 19.0), 1,9-nonanediol diacrylate (SP value: 19.2), tricyclodecane dimethanol diacrylate (SP value: 20.3), cyclic trimethylolpropane formal acrylate (SP value: 19.1), dioxane glycol diacrylate (SP value: 19.4), and EO-modified diglycerin tetraacrylate (SP value: 20.9). It should be noted that a commercial product may also be suitably used as the radically polymerizable compound (B). Examples thereof include ARONIX M-220 (manufactured by TOAGOSEI CO., LTD., SP value: 19.0), LIGHT ACRYLATE 1,9ND-A (manufactured by KYOEISHA CHEMICAL Co., LTD., SP value: 19.2), LIGHT ACRYLATE DGE-4A (manufactured by KYOEISHA CHEMICAL Co., LTD., SP value: 20.9), LIGHT ACRYLATE DCP-A (manufactured by KYOEISHA CHEMICAL Co., LTD., SP value: 20.3), SR531 (manufactured by Sartomer Company, SP value: 19.1), and CD536 (manufactured by Sartomer Company, SP value: 19.4).

Any compound may be used as the radically polymerizable compound (C) without limitation as long as the compound has a radically polymerizable group such as a (meth)acrylate group, and has an SP value of 21.0 $(kJ/m^3)^{1/2}$ or more and 23.0 $(kJ/m^3)^{1/2}$ or less. Specific examples of the radically polymerizable compound (C) include acryloylmorpholine (SP value: 22.9), N-methoxymethylacrylamide (SP value: 22.9), and N-ethoxymethylacrylamide (SP value: 22.3). It should be noted that a commercial product may also be suitably used as the radically polymerizable compound (C). Examples thereof include ACMO (manufactured by KOHJIN, SP value: 22.9), Wasmer 2MA (manufactured by Kasano Kosan Corporation, SP value: 22.9), Wasmer EMA (manufactured by Kasano Kosan Corporation, SP value: 22.3), and Wasmer 3MA (manufactured by Kasano Kosan Corporation, SP value: 22.4).

When a homopolymer of each of the radically polymerizable compounds (A), (B), and (C) has a glass transition temperature (Tg) of 60° C. or more, the Tg of an adhesive layer also becomes high and hence its durability becomes particularly excellent. As a result, for example, when the adhesive layer is formed between the polarizing film and the protective film, the occurrence of the heat shock cracking of the polarizing film can be prevented. Herein, the Tg of a homopolymer of a radically polymerizable compound means a Tg when the radically polymerizable compound is cured (polymerized) alone.

The active energy ray-curable adhesive composition preferably has a low viscosity in consideration of workability and uniformity at the time of its application. Accordingly, the acrylic oligomer (D) obtained by polymerizing the (meth) acrylic monomer also preferably has a low viscosity. The acrylic oligomer having a low viscosity and capable of preventing the curing shrinkage of the adhesive layer is preferably an oligomer having a weight-average molecular weight (Mw) of 15,000 or less, more preferably an oligomer having an Mw of 10,000 or less, particularly preferably an oligomer having an Mw of 5,000 or less. Meanwhile, the weight-average molecular weight (Mw) of the acrylic oligomer (D) is preferably 500 or more, more preferably 1,000 or more, particularly preferably 1,500 or more in order that the curing shrinkage of a cured product layer (adhesive layer) may be sufficiently suppressed. Specific examples of the (meth) acrylic monomer constituting the acrylic oligomer (D) include: (meth)acrylic acid ($C_{1-20}$) alkyl esters such as methyl (meth)acrylate, ethyl (meth)acrylate, n-propyl (meth)acrylate, isopropyl (meth)acrylate, 2-methyl-2-nitropropyl (meth)acrylate, n-butyl (meth)acrylate, isobutyl (meth)acrylate, s-butyl (meth)acrylate, t-butyl (meth)acrylate, n-pentyl (meth)acrylate, t-pentyl (meth)acrylate, 3-pentyl (meth)acrylate, 2,2-dimethylbutyl (meth)acrylate, n-hexyl (meth)acrylate, cetyl (meth)acrylate, n-octyl (meth)acrylate, 2-ethylhexyl (meth)acrylate, 4-methyl-2-propylpentyl (meth) acrylate, and n-octadecyl (meth)acrylate; cycloalkyl (meth) acrylates (such as cyclohexyl (meth)acrylate and cyclopentyl (meth)acrylate), aralkyl (meth)acrylates (such as benzyl (meth)acrylate), polycyclic (meth)acrylates (such as 2-isobornyl (meth)acrylate, 2-norbornylmethyl (meth)acrylate, 5-norbornen-2-yl-methyl (meth)acrylate, and 3-methyl- 2-norbornylmethyl (meth)acrylate), hydroxyl group-containing (meth)acrylic acid esters (such as hydroxyethyl (meth)acrylate, 2-hydroxypropyl (meth)acrylate, and 2,3-dihydroxypropylmethyl-butyl (meth)acrylate), alkoxy group- or phenoxy group-containing (meth)acrylic acid esters (such as 2-methoxyethyl (meth)acrylate, 2-ethoxyethyl (meth)acrylate, 2-methoxymethoxyethyl (meth)acrylate, 3-methoxybutyl (meth)acrylate, ethyl carbitol (meth)acrylate, and phenoxyethyl (meth)acrylate), epoxy group-containing (meth) acrylic acid esters (such as glycidyl (meth)acrylate), halogen-containing (meth)acrylic acid esters (such as 2,2,2-trifluoroethyl (meth)acrylate, 2,2,2-trifluoroethylethyl (meth)acrylate, tetrafluoropropyl(meth)acrylate, hexafluoropropyl(meth)acrylate, octafluoropentyl (meth)acrylate, and heptadecafluorodecyl (meth)acrylate), and alkylaminoalkyl (meth)acrylates (such as dimethylaminoethyl (meth)acrylate). Those (meth)acrylates may be used alone or in combination.

The active energy ray-curable adhesive composition contains 25 to 80 wt % of the radically polymerizable compound (B) with respect to 100 wt % of the total amount of the composition. Further, the active energy ray-curable adhesive composition preferably contains 3 to 40 wt % of the radically polymerizable compound (A), 5 to 55 wt % of the radically polymerizable compound (C), and 3 to 20 wt % of the acrylic oligomer (D) with respect to 100 wt % of the total amount of the composition.

When the active energy ray-curable adhesive composition is used as an electron beam-curable adhesive composition, there is no particular need to incorporate a photopolymerization initiator into the composition. However, when the composition is used as a UV-curable adhesive composition, the photopolymerization initiator is preferably used and a photopolymerization initiator highly sensitive to light having a wavelength of 380 nm or more is particularly preferably used. The photopolymerization initiator highly sensitive to light having a wavelength of 380 nm or more is described later.

In the active energy ray-curable adhesive composition, a compound represented by the below-indicated general formula (1) is preferably used alone as the photopolymerization initiator, or the compound represented by the general formula (1) and the photopolymerization initiator highly sensitive to light having a wavelength of 380 nm or more to be described later are preferably used in combination as the photopolymerization initiator.

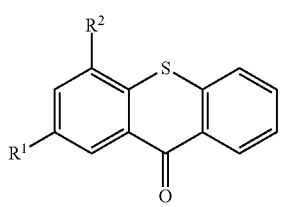

(1)

(In the formula, $R^1$ and $R^2$ each represent —H, —$CH_2CH_3$, -iPr, or Cl, and $R^1$ and $R^2$ may be identical to or different from each other.) In the case where the compound represented by the general formula (1) is used, the composition is excellent in adhesion as compared with that in the case where the photopolymerization initiator highly sensitive to light having a wavelength of 380 nm or more is used alone. Of the compounds each represented by the general formula (1), diethylthioxanthone in which $R^1$ and $R^2$ each represent —$CH_2CH_3$ is particularly preferred. The composition ratio of the compound represented by the general formula (1) in the composition is preferably 0.1 to 5.0 wt %, more preferably 0.5 to 4.0 wt %, still more preferably 0.9 to 3.0 wt % with respect to 100 wt % of the total amount of the composition.

In addition, it is preferred to add a polymerization initiation aid as required. Examples of the polymerization initiation aid include triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate. Of those, ethyl 4-dimethylaminobenzoate is particularly preferred. When the polymerization initiation aid is used, its addition amount is typically 0 to 5 wt %, preferably 0 to 4 wt %, most preferably 0 to 3 wt % with respect to 100 wt % of the total amount of the composition.

In addition, a known photopolymerization initiator may be used in combination as required. A protective film having a UV-absorbing ability does not transmit light having a wavelength of 380 nm or less. Accordingly, the photopolymerization initiator highly sensitive to light having a wavelength of 380 nm or more is preferably used as the photopolymerization initiator. Specific examples thereof include 2-methyl-1-(4-methylthiophenyl)-2-morpholinopropan-1-one, 2-benzyl-2-dimethylamino-1-(4-morpholinophenyl)-butanone-1,2-(dimethylamino)-2-[(4-methylphenyl)methyl]-1-[4-(4-morpholin yl)phenyl]-1-butanone, 2,4,6-trimethylbenzoyldiphenylphosphine oxide, bis(2,4,6-trimethylbenzoyl)phenylphosphine oxide, and bis(η5-2,4-cyclopentadien-1-yl)-bis(2,6-difluoro-3-(1H-pyrrol-1-yl)-phenyl)titanium.

It is particularly preferred to use, in addition to the photopolymerization initiator represented by the general formula (1), as the photopolymerization initiator, a compound represented by the below-indicated general formula (2).

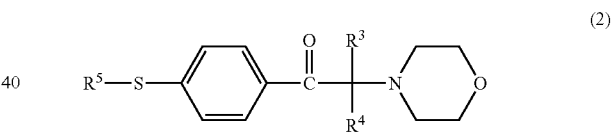

(2)

(In the formula, $R^3$, $R^4$, and $R^5$ each represent —H, —$CH_3$, —$CH_2CH_3$, -iPr, or Cl, and $R^3$, $R^4$, and $R^5$ may be identical to or different from each other.) As the compound represented by the general formula (2), 2-methyl-1-(4-methylthiophenyl)-2-morpholinopropan-1-one, which is also available as a commercial product (trade name: IRGACURE 907, manufactured by BASF), may be suitably used. In addition, 2-benzyl-2-dimethylamino-1-(4-morpholinophenyl)-butanone-1 (trade name: IRGACURE 369, manufactured by BASF) and 2-(dimethylamino)-2-[(4-methylphenyl)methyl]-1-[4-(4-morpholin yl)phenyl]-1-butanone (trade name: IRGACURE 379, manufactured by BASF) are preferred because of high sensitivity.

In addition, various additives may be blended in the active energy ray-curable adhesive composition as any other appropriate component as long as the object and effect of the present invention are not impaired. Examples of such additives may include: polymers and oligomers such as an epoxy resin, polyamide, polyamide imide, polyurethane, polybutadiene, polychloroprene, polyether, polyester, a styrene-butadiene block copolymer, a petroleum resin, a xylene resin, a ketone resin, a cellulose resin, a fluorine-based oligomer, a silicone-based oligomer, and a polysulfide-based oligomer; polymerization inhibitors such as phenothiazine and 2,6-dit-butyl-4-methylphenol; a polymerization initiation aid; a leveling agent; a wettability improving agent; a surfactant; a plasticizer; a UV-absorbing agent; a silane coupling agent; an inorganic filler; a pigment; and a dyestuff.

Of the additives, the silane coupling agent can act on the surface of the polarizing film to impart additional water resistance to the surface. When the silane coupling agent is used, its addition amount is typically 0 to 10 wt %, preferably 0 to 5 wt %, most preferably 0 to 3 wt % with respect to 100 wt % of the total amount of the composition.

Although an active energy ray-curable compound is preferably used as the silane coupling agent, the agent can impart the same water resistance even when the agent is not active energy ray-curable.

Specific examples of the silane coupling agent that is the active energy ray-curable compound include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

Specific examples of the silane coupling agent that is not active energy ray-curable include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, and imidazolesilane.

Of those, 3-methacryloxypropyltrimethoxysilane and 3-acryloxypropyltrimethoxysilane are preferred.

The active energy ray-curable adhesive composition may be used in a mode of an electron beam-curable adhesive composition or a UV-curable adhesive composition.

In the case of the electron beam-curable adhesive composition, any appropriate condition may be adopted as a condition for electron beam irradiation as long as the active energy ray-curable adhesive composition can be cured under the condition. For example, the electron beam irradiation is performed at an accelerating voltage of preferably 5 kV to 300 kV, more preferably 10 kV to 250 kV. When the accelerating voltage is less than 5 kV, an electron beam does not reach the adhesive and hence the curing becomes insufficient in some cases. When the accelerating voltage exceeds 300 kV, the penetrating strength with which the electron beam passes a sample is so strong that the protective film or the polarizing film may be damaged. An irradiation dose is preferably 5 to 100 kGy, more preferably 10 to 75 kGy. When the irradiation dose is less than 5 kGy, the curing of the adhesive becomes insufficient. When the irradiation dose exceeds 100 kGy, the protective film or the polarizing film is damaged to cause a reduction in mechanical strength or yellowing, and hence desired optical characteristics cannot be obtained in many cases.

The electron beam irradiation, which is typically performed in an inert gas, may be performed in the air, or under such a condition that a small amount of oxygen is introduced, as required. When oxygen is appropriately introduced, oxygen inhibition can be caused on the surface of the protective film on which the electron beam impinges first on purpose to prevent damage to the protective film, and hence only the adhesive can be efficiently irradiated with the electron beam, though whether the introduction is effective depends on a material for the protective film.

On the other hand, in the case of the UV-curable adhesive composition, when a protective film to which a UV-absorbing ability has been imparted is used, the film absorbs light having a wavelength shorter than about 380 nm and hence light having a wavelength shorter than 380 nm does not reach the active energy ray-curable adhesive composition. Accordingly, the light does not contribute to the polymerization reaction of the composition. Further, the light having a wavelength shorter than 380 nm absorbed by the protective film is transformed into heat and hence the protective film itself generates heat, which is responsible for the defects of the polarizing plate such as curling and wrinkles. Accordingly, when the UV-curable adhesive composition is adopted, an apparatus that does not generate light having a wavelength shorter than 380 nm is preferably used as a UV-generating apparatus. More specifically, a ratio between a cumulative illuminance in the wavelength range of 380 to 440 nm and a cumulative illuminance in the wavelength range of 250 to 370 nm is preferably 100:0 to 100:50, more preferably 100:0 to 100:40. Preferred as a light source for UV light satisfying such relationship between the cumulative illuminances is a gallium-doped metal halide lamp or an LED light source that emits light having a wavelength in the range of 380 to 440 nm. Alternatively, the following is permitted: a low-pressure mercury lamp, a middle-pressure mercury lamp, a high-pressure mercury lamp, an ultrahigh-pressure mercury lamp, an incandescent lamp, a xenon lamp, a halogen lamp, a carbon-arc lamp, a metal halide lamp, a fluorescent lamp, a tungsten lamp, a gallium lamp, an excimer laser, or sunlight is used as a light source, and light remaining after the shielding of light having a wavelength shorter than 380 nm with a band-pass filter is used.

In the case of the UV-curable adhesive composition, the active energy ray-curable adhesive composition is preferably warmed before being irradiated with UV light (warming before irradiation). In that case, the composition is warmed to preferably 40° C. or more, more preferably 50° C. or more. It is also preferred that the active energy ray-curable adhesive composition be warmed after having been irradiated with UV light (warming after irradiation). In that case, the composition is warmed to preferably 40° C. or more, more preferably 50° C. or more.

The active energy ray-curable adhesive composition may be suitably used particularly when an adhesive layer that bonds the polarizing film and a protective film whose transmittance for a light beam having a wavelength of 365 nm is less than 5% is formed. That is, the first protective film and/or the second protective film can have a transmittance for a light beam having a wavelength of 365 nm of less than 5%, or can have a UV-absorbing ability. In this case, when the active energy ray-curable adhesive composition contains the photopolymerization initiator represented by the general formula (1), the composition can be cured to form an adhesive layer by being irradiated with UV light through a protective film having a UV-absorbing ability. Accordingly, the adhesive layer can be cured even in a polarizing plate obtained by laminating a protective film having a UV-absorbing ability on each of both surfaces of the polarizing film. In this regard, however, it should be appreciated that the adhesive layer can be cured even in a polarizing plate obtained by laminating a protective film having no UV-absorbing ability. It should be noted that the term "protective film having a UV-absorbing ability" means a protective film whose transmittance for light having a wavelength of 380 nm is less than 10%.

A method of imparting a UV-absorbing ability to a protective film is, for example, a method involving incorporating a UV-absorbing agent into the protective film or a method involving laminating a surface treatment layer containing the UV-absorbing agent on the surface of the protective film.

Specific examples of the UV-absorbing agent include a conventionally known oxybenzophenone-based compound, benzotriazole-based compound, salicyclic acid ester-based compound, benzophenone-based compound, cyanoacrylate-based compound, nickel complex salt-based compound, and triazine-based compound.

The adhesive layer formed of the active energy ray-curable adhesive composition has higher durability than that of an aqueous adhesive layer. In the present invention, an adhesive layer having a Tg of 60° C. or more is preferably used as the adhesive layer. In addition, the thickness of the adhesive layer is preferably controlled to 0.01 to 7 μm. When the active energy ray-curable adhesive composition providing an adhesive layer having a Tg as high as 60° C. or more is used and the thickness of the adhesive layer is controlled to fall within a predetermined range, durability under severe environments, i.e., under a high humidity and under a high temperature can be satisfied. In consideration of the durability of the polarizing plate, when the Tg (° C.) of the adhesive layer is defined as A and the thickness (μm) of the adhesive layer is defined as B, an expression (1) "A−12×B>58" is preferably satisfied.

As described above, the active energy ray-curable adhesive composition is preferably selected so that the Tg of the adhesive layer formed of the composition may be 60° C. or more. The Tg is more preferably 70° C. or more, still more preferably 75° C. or more, yet still more preferably 100° C. or more, even yet still more preferably 120° C. or more. On the other hand, when the Tg of the adhesive layer becomes excessively high, the flexibility of the polarizing plate may reduce. Accordingly, the Tg of the adhesive layer is set to preferably 300° C. or less, more preferably 240° C. or less, still more preferably 180° C. or less.

In addition, the thickness of the adhesive layer is preferably 0.01 to 7 μm, more preferably 0.01 to 5 μm, still more preferably 0.01 to 2 μm, most preferably 0.01 to 1 μm. When the thickness of the adhesive layer is less than 0.01 μm, the cohesive strength of the adhesive layer itself is not obtained and hence an adhesive strength is not obtained in some cases. On the other hand, when the thickness of the adhesive layer exceeds 7 μm, the polarizing plate may be unable to satisfy durability.

Specific examples of the active energy ray-curable adhesive and a curing method therefor are disclosed in, for example, Japanese Patent Application Laid-open No. 2012-144690. The disclosure is incorporated herein by reference.

D-2. Other Adhesive or Pressure-Sensitive Adhesive

In the present invention, as described above, at least one of the first protective film 21 and the second protective film 22 can be laminated through the adhesive having a moisture content of 10% or less (low-moisture content adhesive). In other words, one of the first protective film 21 and the second protective film 22 may be laminated by using an adhesive except the low-moisture content adhesive (hereinafter referred to as "other adhesive") or a pressure-sensitive adhesive. That is, the other adhesive or pressure-sensitive adhesive may be used in the lamination of the first protective film 21 or may be used in the lamination of the second protective film 22. The other adhesive may be an aqueous adhesive or may be a solvent-based adhesive. Of those, the aqueous adhesive is preferably used. Moisture in the aqueous adhesive can migrate to the PVA-based resin layer. Accordingly, the stability of the iodine complex reduces, and in particular, an iodine complex having low orientation property is brought into a state of being easily decomposed because its original stability is low. As a result, the decomposition of the iodine complex having low orientation property can be selectively promoted.

Any appropriate aqueous adhesive may be adopted as the aqueous adhesive. An aqueous adhesive containing a PVA-based resin is preferably used. The average polymerization degree of the PVA-based resin in the aqueous adhesive is preferably about 100 to 5,500, more preferably 1,000 to 4,500 in terms of adhesion. Its average saponification degree is preferably about 85 mol % to 100 mol %, more preferably 90 mol % to 100 mol % in terms of adhesion.

The PVA-based resin in the aqueous adhesive preferably contains an acetoacetyl group. This is because such resin can be excellent in adhesiveness between the PVA-based resin layer and the protective film, and in durability. The acetoacetyl group-containing PVA-based resin is obtained by, for example, causing a PVA-based resin and diketene to react with each other by any appropriate method. The acetoacetyl group modification degree of the acetoacetyl group-containing PVA-based resin is typically 0.1 mol % or more, preferably about 0.1 mol % to 40 mol %, more preferably 1 mol % to 20 mol %, particularly preferably 2 mol % to 7 mol %. It should be noted that the acetoacetyl group modification degree is a value measured by NMR.

The resin concentration of the aqueous adhesive is preferably 0.1 wt % to 15 wt %, more preferably 0.5 wt % to 10 wt %.

The thickness of the adhesive at the time of the application can be set to any appropriate value. For example, the thickness is set so that an adhesive layer having a desired thickness may be obtained after heating (drying). The thickness of the adhesive layer is preferably 10 nm to 300 nm, more preferably 10 nm to 200 nm, particularly preferably 20 nm to 150 nm.

Upon laminating the first protective film through the aqueous adhesive, moisture content per unit area in the aqueous adhesive is preferably 0.05 mg/cm² or more. Meanwhile, the moisture content is preferably 2.0 mg/cm² or less, more preferably 1.0 mg/cm² or less. When the moisture content is excessively high, drying of the adhesive may take long time. It should be noted that the moisture content per unit area can be obtained from moisture content in the adhesive and application amount on the surface of the polarizing film.

A temperature for the heating is preferably 50° C. or more, more preferably 55° C. or more, still more preferably 60° C. or more, particularly preferably 80° C. or more. It should be noted that the heating in the lamination of the first protective film may also serve as the drying treatment of the laminate. In addition, the heating may be performed before or after the peeling of the resin substrate, and is preferably performed before the peeling.

Second Embodiment

As described above, the method of producing a polarizing plate according to this embodiment includes: stretching and dyeing a laminate including a resin substrate and a polyvinyl alcohol-based resin layer formed on one side of the resin substrate to produce a polarizing film on the resin substrate; and peeling the resin substrate, followed by laminating a protective film on the polarizing film on a side from which the resin substrate has been peeled. That is, in this embodiment, the following may be adopted: the first protective film is not laminated, the resin substrate is peeled, and the protective film (as described above, the protective film corresponds to the second protective film in the first embodiment) is laminated on the polarizing film on the side from which the resin substrate has been peeled. In this embodiment, the protective film can be laminated through an adhesive having a moisture content of 10% or less. It should be noted that in this embodiment, any appropriate supporting member (such as a supporting film) may be placed on the polarizing film on an opposite side to the resin substrate upon peeling of the resin substrate.

<Others>

Although specific embodiments of the present invention have been described as the first embodiment and the second embodiment, it goes without saying that the present invention is not limited to these embodiments. For example, the first embodiment and the second embodiment may be appropriately combined, or the first embodiment and/or the second embodiment, and a material, operation, and the like known in the art may be combined.

Hereinafter, the present invention is specifically described byway of Examples. However, the present invention is not limited to Examples below. It should be noted that methods of measuring respective characteristics are as described below.

1. Thickness

Measurement was performed with a digital micrometer (manufactured by ANRITSU CORPORATION, product name "KC-351C").

2. Glass Transition Temperature (Tg)

Measurement was performed in conformity with JIS K 7121.

3. Moisture Permeability

The amount (g) of water vapor which passed a sample having an area of 1 $m^2$ within 24 hours in an atmosphere having a temperature of 40° C. and a humidity of 92% RH was measured in conformity with the moisture permeability test (cup method) of JIS 20208.

4. Moisture Content

A moisture content was measured by the Karl Fischer titration method. Details about a measuring apparatus and a measurement condition are as described below.

Measurement apparatus: coulometric titration-type moisture meter (manufactured by Mitsubishi Chemical Corporation, CA-06), heating vaporization apparatus (manufactured by Mitsubishi Chemical Corporation, VA-06)

Measurement condition: Heating vaporization method (heating at 150° C.)

Anolyte: AQUAMICRON AKX (manufactured by API Corporation)

Catholyte: AQUAMICRON CXU (manufactured by API Corporation)

Example 1

An amorphous polyethylene terephthalate (A-PET) film (manufactured by Mitsubishi Chemical Corporation, trade name "NOVACLEAR," thickness: 100 μm) having a coefficient of water absorption of 0.60% and a Tg of 80° C. was used as a resin substrate.

An aqueous solution of a polyvinyl alcohol having a polymerization degree of 4,200 and a saponification degree of 99.2 mol % was applied to one surface of the resin substrate and dried at 60° C. to form a PVA-based resin layer having a thickness of 10 μm. Thus, a laminate was produced.

The resultant laminate was subjected to free-end uniaxial stretching in its longitudinal direction (lengthwise direction) at a ratio of 1.8 times between rolls having different peripheral speeds in an oven at 120° C. (preliminary in-air stretching).

Next, the laminate was immersed in an insolubilizing bath having a liquid temperature of 30° C. (an aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. (an aqueous solution of iodine obtained by compounding 100 parts by weight of water with 0.2 part by weight of iodine and 1.0 part by weight of potassium iodide) for 60 seconds (dyeing treatment).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking treatment).

After that, the laminate was subjected to uniaxial stretching in its longitudinal direction (lengthwise direction) between rolls having different peripheral speeds while being immersed in an aqueous solution of boric acid having a liquid temperature of 70° C. (an aqueous solution obtained by compounding 100 parts by weight of water with 4 parts by weight of boric acid and 5 parts by weight of potassium iodide) (underwater stretching). In this case, the laminate was stretched until just before its rupture (the maximum stretching ratio was 6.0 times).

After that, the laminate was immersed in a washing bath having a liquid temperature of 30° C. (an aqueous solution obtained by compounding 100 parts by weight of water with 4 parts by weight of potassium iodide) (washing treatment).

Subsequently, the resin substrate was peeled from the laminate. After that, the below-described adhesive was applied to the peeled surface so that the thickness of an adhesive layer after its curing became 0.5 μm, and then a protective film (acrylic resin film, thickness: 40 μm, moisture permeability: 80 g/$m^2$·24 h) was attached to the surface. The adhesive was warmed to 50° C. from the attached film side with an IR heater, and was then cured by being irradiated with the below-described UV light.

Thus, a polarizing plate including a polarizing film having a thickness of 4.5 μm was produced.

(Adhesive Composition)

An adhesive was prepared by mixing 40 parts by weight of N-hydroxyethylacrylamide (HEAA), 60 parts by weight of acryloylmorpholine (ACMO), and 3 parts by weight of a photoinitiator "IRGACURE 819" (manufactured by BASF).

(UV Light)

UV light (gallium-doped metal halide lamp, irradiation apparatus: Light HAMMER 10 manufactured by Fusion UV Systems, Inc., bulb: V bulb, peak illuminance: 1,600 mW/$cm^2$, cumulative dose: 1,000/mJ/$cm^2$ (wavelength: 380 to 440 nm)) was used as an active energy ray. It should be noted that the illuminance of the UV light was measured with a Sola-Check System manufactured by Solatell.

Example 2

Steps up to the stretching of the laminate (washing treatment) were performed in the same manner as in Example 1. Subsequently, the attachment of a first protective film was performed as described below.

An aqueous solution of a PVA-based resin (manufactured by The Nippon Synthetic Chemical Industry Co., Ltd., trade name "GOHSEFIMER (trademark) Z-200," resin concentration: 3 wt %, moisture content: 97%) was applied to the PVA-based resin layer surface of the laminate so that the thickness of an adhesive layer after its heating became 90 nm, and then the first protective film (acrylic resin film, thickness: 40 μm, moisture permeability: 80 g/m²·24 h) was attached to the surface, followed by heating in an oven maintained at 80° C. for 5 minutes.

Subsequently, the resin substrate was peeled from the laminate. After that, the same adhesive as that of Example 1 was applied to the peeled surface so that the thickness of an adhesive layer after its curing became 0.5 μm, and then a second protective film (norbornene-based resin film, manufactured by JSR Corporation, trade name "Arton," thickness: 35 μm) was attached to the surface. The adhesive was warmed to 50° C. from the attached film side with an IR heater, and was then cured by being irradiated with UV light in the same manner as in Example 1. Adhesive composition and irradiation conditions were the same as those of Example 1.

Thus, a polarizing plate including a polarizing film having a thickness of 4.5 μm was produced.

Example 3

A polarizing plate was produced in the same manner as in Example 2 except that: the below-described adhesive was used in the lamination of the second protective film; and irradiation with an electron beam was performed under the below-described conditions.
(Adhesive)
An adhesive was prepared by mixing 60 parts by weight of N-hydroxyethylacrylamide (HEAA) and 40 parts by weight of acryloylmorpholine (ACMO).
(Conditions for Electron Beam Irradiation)
Accelerating voltage: 250 kV
Irradiation dose: 20 kGy Example 4

A polarizing plate was produced in the same manner as in Example 2 except that the lamination of the first protective film was performed with the UV-curable adhesive of Example 1.

Comparative Example 1

A polarizing plate was produced in the same manner as in Example 2 except that both the first protective film and the second protective film were each laminated with the below-described aqueous adhesive.

An aqueous solution of a PVA-based resin (manufactured by The Nippon Synthetic Chemical Industry Co., Ltd., trade name "GOHSEFIMER (trademark) Z-200," resin concentration: 3 wt %, moisture content: 97%) was applied to the PVA-based resin layer surface of the laminate so that the thickness of an adhesive layer after its heating became 90 nm, and then the first protective film (acrylic resin film, thickness: 40 μm, moisture permeability: 80 g/m²·24 h) was attached to the surface, followed by heating in an oven maintained at 80° C. for 5 minutes. Subsequently, the resin substrate was peeled from the laminate. After that, the same film as the first protective film was attached as the second protective film in the same manner as in the first protective film.

The polarization degree and single axis transmittance of each of the polarizing plates obtained in Examples and Comparative Example were measured. Methods of measuring the polarization degree and the single axis transmittance are as described below. Table 1 shows the results of the measurement together with a system for the lamination (adhesion) of each of the first protective film and the second protective film, and the moisture content of an adhesive used in the lamination. In addition, Table 1 shows the result of the measurement of the polarization degree of a polarizing plate (Reference Example) obtained without the lamination of the second protective film after the peeling of the resin substrate in Example 1.

It should be noted that in each of Example 1 and Reference Example, the measurement of the optical characteristics was performed in a state where the resin substrate had been peeled. The foregoing is intended for the elimination of influences of a difference in surface reflection of the resin substrate on the results of the measurement. In addition, in each of Examples 2 to 4 and Comparative Example 1, the refractive index of the first protective film is about 1.50 and the refractive index of the second protective film is about 1.53. In addition, in Example 1, the refractive index of the PVA-based resin on one surface of the outermost surface is about 1.53, the other surface of the outermost surface is the protective film formed of an acrylic resin film having a refractive index of about 1.50, and a combination of the refractive indices of the outermost surface is 1.50/1.53. In each construction, the combination of the refractive indices of the outermost surface was 1.50/1.53, and comparison was performed in such a construction that the surface reflection had no influences on the results of the measurement.

(Method of Measuring Polarization Degree)
The single axis transmittance (Ts), parallel transmittance (Tp), and crossed transmittance (Tc) of a polarizing film were measured with a UV-visible spectrophotometer (manufactured by JASCO Corporation, product name "V7100"), and then its polarization degree (P) was determined from the following equation.

$$\text{Polarization degree }(P)\,(\%)=\{(Tp-Tc)/(Tp+Tc)\}^{1/2}\times 100$$

It should be noted that the Ts, Tp, and Tc are each a Y value obtained through measurement with the two-degree field of view (C-light source) of JIS Z 8701 and color correction.

TABLE 1

| | Adhesion system 1 | Adhesion system 2 | Moisture content 1 (%) | Moisture content 2 (%) | Optical characteristics | |
|---|---|---|---|---|---|---|
| | | | | | Ts | P |
| Example 1 | — | UV | — | 1 | 42.5% | 99.997% |
| Example 2 | Aqueous | UV | 97 | 1 | 42.5% | 99.995% |
| Example 3 | Aqueous | EB | 97 | 2 | 42.5% | 99.995% |
| Example 4 | UV | UV | 1 | 1 | 42.6% | 99.996% |
| Comparative Example 1 | Aqueous | Aqueous | 97 | 97 | 42.5% | 99.990% |
| Reference Example | Aqueous | — | 97 | — | 42.5% | 99.995% |

*Adhesion system 1: The adhesive used in the lamination of the first protective film
Adhesion system 2: The adhesive used in the lamination of the second protective film
Moisture content 1: The moisture content of the adhesive used in the lamination of the first protective film
Moisture content 2: The moisture content of the adhesive used in the lamination of the second protective film The polarization degree of each of Examples at a single axis transmittance of 42.5% was higher than that of Comparative Example. Comparison between Examples and Comparative Example shows that an adhesive having a low moisture content is preferably used in the lamination of at least one of the first protective film and the second protective film.

The polarizing plate of the present invention is suitably used for antireflection plates for liquid crystal panels of, for example, a liquid crystal television, a liquid crystal display, a cellular phone, a digital camera, a video camera, a portable game machine, a car navigation system, a copying machine, a printer, a facsimile machine, a watch and a clock, and a microwave oven, and organic EL devices.

According to one embodiment of the present invention, in a method of producing a polarizing plate including stretching and dyeing a laminate including a resin substrate and a polyvinyl alcohol-based resin layer formed on one side of the resin substrate to produce a polarizing film on the resin substrate, the polarizing plate excellent in optical characteristics can be produced by laminating at least one of protective films, which are laminated on one side or both sides of the polarizing film, through an adhesive having a moisture content of 10% or less.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A method of producing a polarizing plate, comprising:
    stretching and dyeing a laminate including a resin substrate and a polyvinyl alcohol-based resin layer formed on one side of the resin substrate to produce a polarizing film on the resin substrate;
    laminating a first protective film on the polarizing film on an opposite side to the resin substrate; and
    peeling the resin substrate, followed by laminating a second protective film on the polarizing film on a side from which the resin substrate has been peeled,
    the laminating of at least one of the first protective film and the second protective film being performed through an adhesive having a moisture content of 10% or less.

2. The production method according to claim 1, wherein the laminating of the first protective film is performed through an aqueous adhesive.

3. The production method according to claim 2, wherein the adhesive having a moisture content of 10% or less comprises an active energy ray-curable adhesive.

4. A polarizing plate, which is obtained by the production method according to claim 2.

5. The production method according to claim 1, wherein the adhesive having a moisture content of 10% or less comprises an active energy ray-curable adhesive.

6. A polarizing plate, which is obtained by the production method according to claim 1.

7. A method of producing a polarizing plate, comprising:
    stretching and dyeing a laminate including a resin substrate and a polyvinyl alcohol-based resin layer formed on one side of the resin substrate to produce a polarizing film on the resin substrate; and
    peeling the resin substrate, followed by laminating a protective film on the polarizing film on a side from which the resin substrate has been peeled,
    the laminating of the protective film being performed through an adhesive having a moisture content of 10% or less.

8. The production method according to claim 7, wherein the adhesive having a moisture content of 10% or less comprises an active energy ray-curable adhesive.

9. A polarizing plate, which is obtained by the production method according to claim 7.

* * * * *